United States Patent [19]
Koziol

[11] Patent Number: 5,291,875
[45] Date of Patent: Mar. 8, 1994

[54] ADJUSTABLE TUBE ASSEMBLY FOR A GAS BARBECUE GRILL

[75] Inventor: Walter Koziol, Antioch, Ill.

[73] Assignee: Modern Home Products Corp., Antioch, Ill.

[21] Appl. No.: 961,991

[22] Filed: Oct. 16, 1992

[51] Int. Cl.$^5$ .............................................. F24C 3/00
[52] U.S. Cl. ................................. 126/41 R; 431/354; 48/180.1
[58] Field of Search ...................... 126/41 R; 431/354; 48/180.1

[56] References Cited

U.S. PATENT DOCUMENTS

| Re. 32,133 | 5/1986 | Koziol | 126/39 |
|---|---|---|---|
| 2,722,970 | 11/1955 | Stechmann | 155/88 |
| 3,318,560 | 5/1967 | Garrette, Jr. et al. | 248/44 |
| 3,347,575 | 10/1967 | Morris | 287/58 |
| 4,478,205 | 10/1984 | Koziol | 126/41 R |
| 4,586,483 | 5/1986 | Perez | 48/180.1 |
| 4,598,692 | 7/1986 | Hitch | 126/41 |
| 4,773,384 | 9/1988 | Koziol | 126/41 R |
| 4,909,238 | 3/1990 | Cassie | 126/41 |
| 4,932,392 | 6/1990 | Home | 126/41 |

FOREIGN PATENT DOCUMENTS 2524492 12/1976 Fed. Rep. of Germany .

Primary Examiner—Carroll B. Dority
Attorney, Agent, or Firm—Quarles & Brady

[57] ABSTRACT

A gas venturi tube assembly for a barbecue grill which can be utilized in a wide variety of gas barbecue grill burner elements and base portions. A venturi tube and gas intake member telescope together for retentive adjustment. There are internal adjustable securing mechanisms provided between the venturi tube and the gas intake member so that communication between the gas supply and the burner element can be made irrespective of the placement of the burner element on the floor of the barbecue grill base and the distance from the gas supply. The internal adjustable securing mechanisms include an internal cavity in the gas intake member and a biased member extending from the venturi tube for placement in the internal cavity. In a preferred manner, the internal cavity is provided by a corrugated flexible section in the gas intake member, and the biased member is provided by a spring member extending through a wall of the venturi tube.

17 Claims, 3 Drawing Sheets

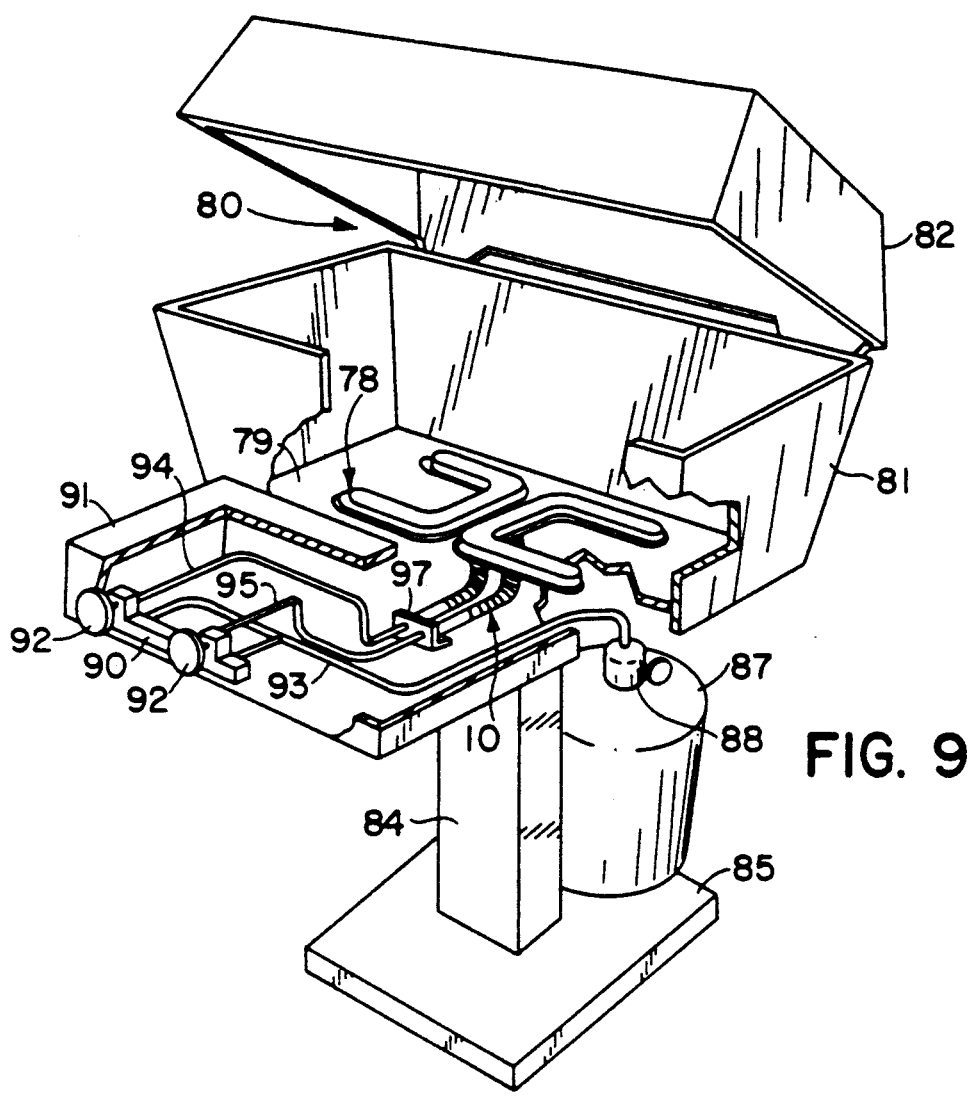
FIG. 9
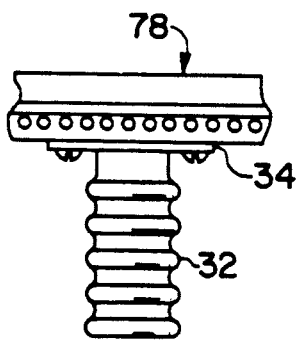
FIG. 10
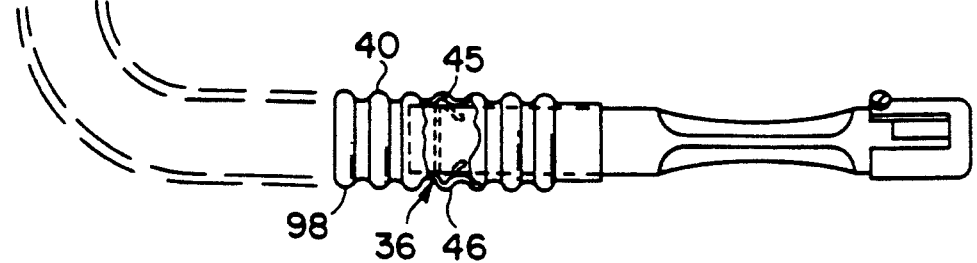

ADJUSTABLE TUBE ASSEMBLY FOR A GAS BARBECUE GRILL

BACKGROUND OF THE INVENTION

This invention relates to a gas venturi tube for a burner element in a barbecue gas grill. More particularly, it relates to a flexible and internally adjustable gas intake assembly for a gas burner element so that proper connection can be made between the burner element and a gas supply nozzle irrespective of the vertical or horizontal or vertical and horizontal distance the burner element is supported from the grill floor in relation to the gas supply.

Various barbecue grill bases have floors for the burner element located at various positions on the floor and located vertically and/or horizontally from the gas supply nozzle. Accordingly, it is necessary to construct each gas intake pipe and venturi tube to match the particular distance from the burner element and the gas supply nozzle so that the burner element is in communication with the gas supply pipe. Cost savings can be effected if a venturi tube is fabricated so as to fit in a suitable manner the many burner elements in a barbecue base portion and provide proper and adjustable connection with a gas supply. It is also highly desirable if the adjustable connection provided by the venturi tube affords a secure fitment.

The state of the art for retentive and adjustable gas delivery systems for barbecue grills is represented in U.S. Pat. No. RE 32,133. In RE 32,133, which is commonly assigned, an adjustable securing means such as represented by screw 51 and dimples 50 are provided on the venturi tube 24 and a gas intake tube 55. Also, there is disclosed shear tubes 75 and 76 as well as threads 71 for this same purpose. Concerning other prior art, in German Pat. No. 25 24 492 there is described a gas cooking unit wherein a gas connection can be made with flexible coiled tubing or telescoping tubes. This particular unit is of the range and oven type, and the gas connection is for a one-time installation. In U.S. Pat. No. 4,598,692 there is a slidable venturi tube which is internally retained in a flexible tube. However, there is no internal adjustment.

The prior art does not provide an adjustable venturi tube assembly wherein retentive adjustment can be made internally of the assembly. Such internal adjustment is desirable not only from an aesthetic standpoint, but also because it can obviate the use of tools. The additional retentive feature provides for a positive attachment without further undesired movement during subsequent use.

It is an advantage of the present invention to provide a venturi tube for a burner in a gas barbecue grill which can operatively provide an adjustable and positive connection between various gas burner elements in grill base floors and gas intake nozzles which are spaced horizontally and/or vertically from the burner.

It is another advantage of this invention to provide an adjustable venturi tube assembly of the foregoing type wherein retentive adjustment is made internally of two telescoping tubes.

It is still another advantage of this invention to provide an adjustable venturi tube assembly of the foregoing type which allows for adjustment without tools.

It is yet another advantage of the present invention to provide an adjustable venturi tube assembly of the foregoing type which can be manufactured and assembled with few parts and in an economical manner.

SUMMARY OF THE INVENTION

The foregoing advantages are accomplished by the present adjustable gas venturi tube assembly for a gas burner element which comprises a first tubular member defining at least one aperture. An air regulator member is received by the first tubular member at one end thereof to control the flow of air entering through the aperture. An opening is defined by the first tubular member at one end for receiving a gas supply means. A second tubular member is connected to the first tubular member at another end of the first tubular member in a telescoping and slidable relationship. There are means securing the second tubular member to the gas burner element at an end opposite the connection to the first tubular member. Internal adjustable securing means are operatively associated with the first and second tubular members so as to retentively maintain the tubular members in various extendable positions with respect to each other.

In a preferred embodiment, one of the first or second tubular members has a multiplicity of internal cavity portions, and the other has biasing means for reception in the internal cavity portions.

In an even more preferred embodiment, the second tubular member has the internal cavity portions which are defined by a corrugated flexible section. The first tubular member telescopes inside the second tubular member, and the first tubular member has the biasing means which are defined by a spring member having opposing projection portions extending through a wall of the tubular member for selective engagement in the internal cavities formed by the corrugated flexible section.

In one aspect, the spring member is of one piece construction and has an intermediate portion extending between the opposing projection portions with the intermediate portion positioned circumferentially with respect to the first tubular member.

In another aspect, the two part flexible and length adjustable gas/air feeder venturi tube assembly can be easily retrofitted to most gas barbecue grills or can be used by an original equipment manufacturer where various models require different sizes and shapes of venturi tube assemblies.

BRIEF DESCRIPTION OF DRAWINGS

A better understanding of the present internally adjustable venturi tube for a burner element will be accomplished by reference to the drawings wherein:

FIG. 9 is a perspective view of a gas barbecue grill unit with portions broken away to illustrate a further embodiment of the adjustable venturi tube.

FIG. 10 is a partial enlarged view of one of the adjustable venturi tubes illustrated in FIG. 9.

DESCRIPTION OF THE PREFERRED EMBODIMENTS

Figure 1:
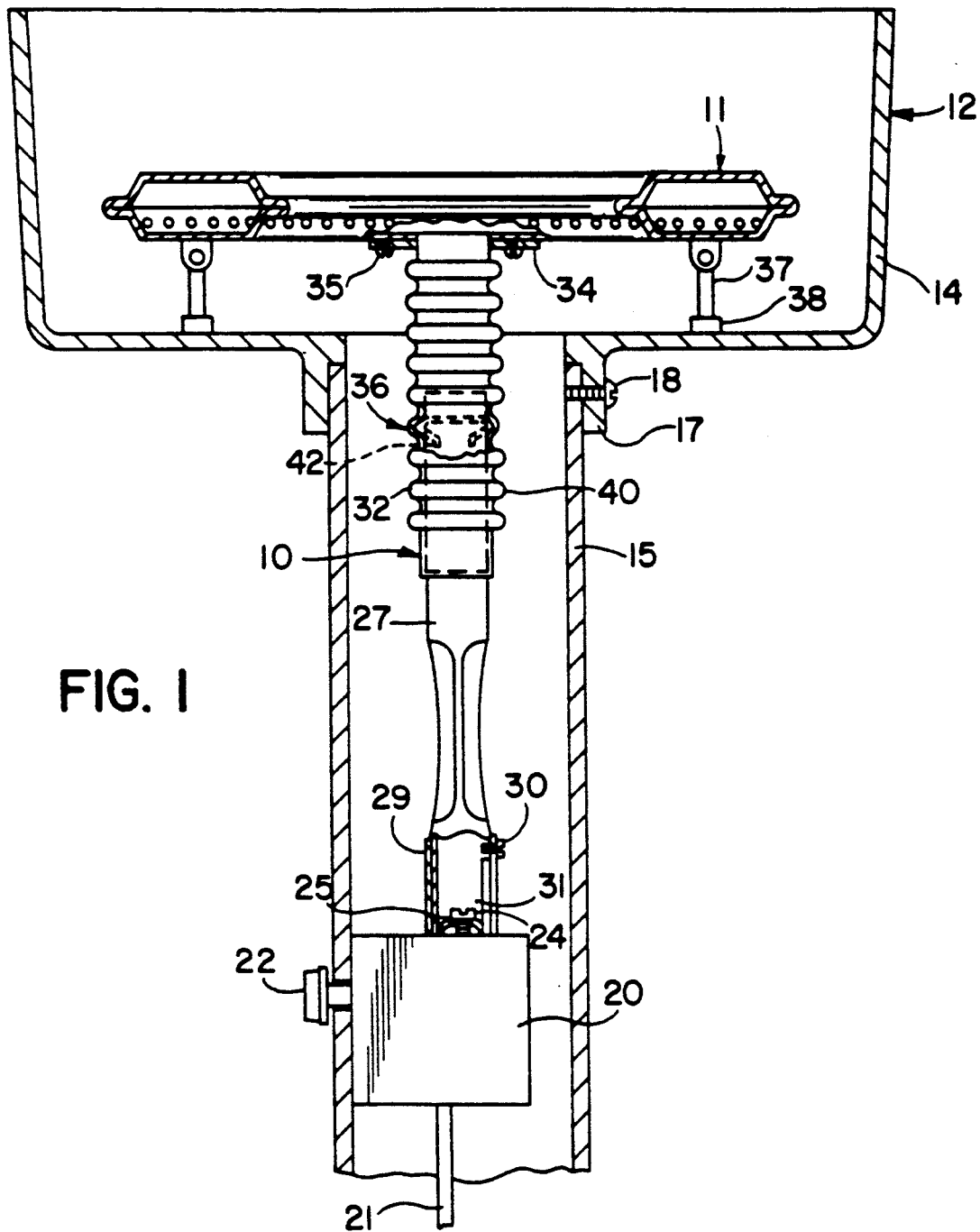
FIG. 1 is a view in partial vertical section of a grill and burner unit showing the adjustable venturi tube assembly of this invention.

Proceeding to a detailed description of the present invention, an adjustable venturi tube assembly is shown generally at 10 in conjunction with burner unit generally 11 and a barbecue grill generally 12. The grill 12 has the usual base 14 and a supporting post 15 which is attached to the base 14 by the usual flange 17 and screw 18. The post 15 houses the usual gas control valve 20 having a gas inlet line 21 and a control knob 22. A gas supply nozzle 24 extends through an opening 25 in the venturi tubular member 27. The usual rotatable shutter 29 is adjustably connected to the tubular member 27 by the screw 30 to control the flow of air through opening 31 in the usual manner.

The venturi assembly 10 includes the flexible tube 32 having the corrugations 40. The tubular member 27 is straight and cylindrical as well as substantially rigid. It is telescopingly and slidably received in the flexible tube 32 which is connected to the burner 11 by the flange 34 and the screws 35. The burner 11 is supported above the base floor 39 by the legs 37 and pads 38. The combination of the flexible tube 32 and the slidable tubular member 27 provides vertical adjustment with respect to the nozzle 24 and the position of the burner 11 in the base 14. The important feature of this invention is the fact that not only is the adjustment available, but that the adjustment is afforded in an internal and retentive manner by the securing means generally 36.

Figure 2:
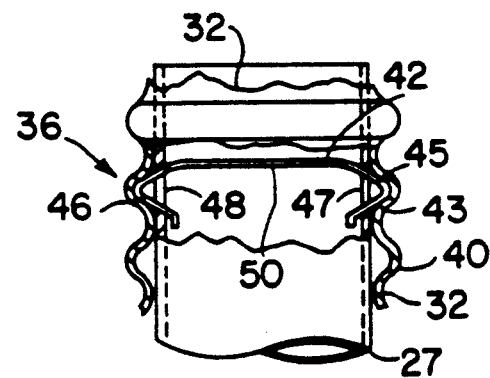
FIG. 2 is an enlarged partial view and partially in vertical section illustrating the novel internal adjustment feature of the venturi tube assembly.
Figure 3:
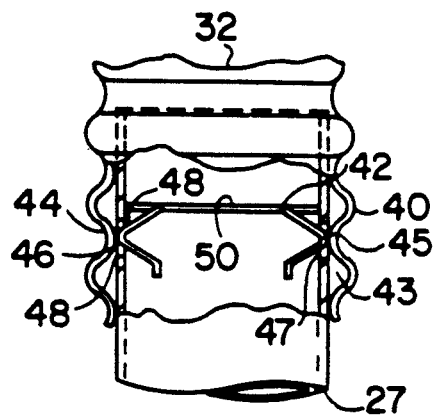
FIG. 3 is a view similar to FIG. 1 illustrating the adjustable venturi tube assembly in an intermediate position.
Figure 4:
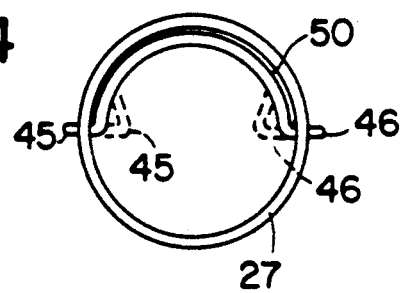
FIG. 4 is a top plan view of the inner tube member of the adjustable tube assembly.

Referring specifically to FIGS. 2-4, it is seen that the securing means 36 includes a spring member 42, having the opposing projections 45 and 46 which are positioned through openings 47 and 48 in the tubular member 27. The projections are interconnected by an intermediate portion 50 which is positioned in a circumferential manner with respect to tubular member 27. As specifically seen in FIG. 2, the projections 45 and 46 extend through the openings 47 and 48 to engage in the cavities 43 formed by the corrugations 40. FIG. 2 represents a temporary locked or retentive position. In FIG. 3, there is shown an intermediate position as the projections 45 and 46 of spring member 42 would ride over the innermost diameter portions 44 of the corrugations 40 and would be retracted into the openings 47 and 48.

Figure 5:
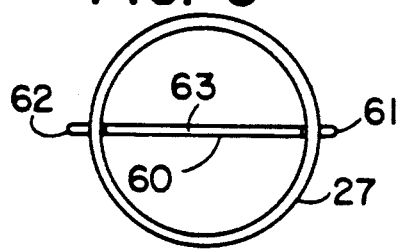
FIG. 5 is a view similar to FIG. 4 showing an alternative embodiment.
Figure 6:
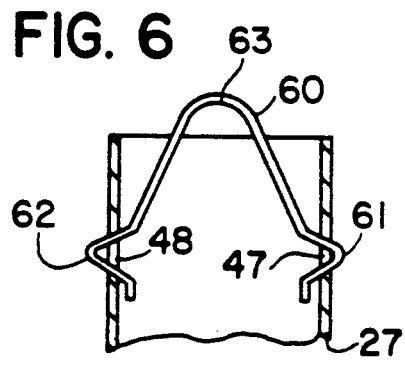
FIG. 6 is a side elevational view and in partial vertical section of the embodiment shown in FIG. 5.
Figure 8:
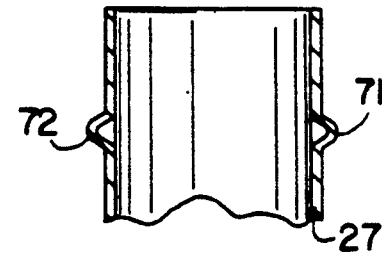
FIG. 8 is a view in vertical section of the embodiment shown in FIG. 7.

FIGS. 5 and 6 describe an alternative embodiment for the internal adjustable securing means 36. There it is seen that the spring member 60 has the projections 61 and 62 extending through the openings 47 and 48 when in an expanded position. However, it is different from spring member 42 in that it has the intermediate hoop like portion 63 which extends along and is aligned with the longitudinal axis of the tubular member 27 rather than circumferentially as with spring 42.

Figure 7:
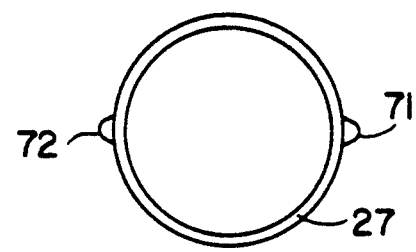
FIG. 7 is a view similar to FIG. 4 showing still another embodiment.

FIG. 7 illustrates yet another alternative embodiment for the internal adjustable securing means where in place of the previous springs 42 and 60, there are placed opposing dimples 71 and 72 on the tubular member 27. These indentations would function in a similar manner as do the projections 45 and 46 for the spring member 42. However, they would not extend through an opening in the tubular member 27 but would still engage into the cavity portions 43 of the corrugations 40 of flexible tube 32. Obviously, they would be designed of sufficient size so that they can be force or friction fitted over the inner portions 44 of the corrugations 40 as indicated in FIG. 3 for spring 42.

Referring to FIGS. 9 and 10, there is shown an additional embodiment of the adjustable venturi tube assembly 10 in conjunction with a gas barbecue grill generally 80 which is of the double burner and pedestal type. Grill 80 has the usual base 81 and cover 82. A dual burner 78 is supported above the floor 79, and two venturi assemblies are employed. The grill base 81 is supported by the post 84 which in turn is connected to the foot base 85. A gas supply tank 87 is placed on the foot base 85 and has a valve 88 for controlling the supply of gas through gas feed line 93. There is a housing 91 for a gas control 90 having control knobs 92 to control gas from line 93 and into lines 94 and 95 which are connected to support bracket 97 for the two venturis 10. Gas is thereby fed to the venturis 10 and ultimately to the dual burner 78.

With reference to FIG. 10 specifically, it is seen that a portion of the flexible tube 32 is bent at a ninety degree angle to accommodate the front control gas connection as represented by housing 91. The corrugations of the straight portion 98 of the flexible tube 32 still accepts the projections 45 and 46 of the tubular member for retentive adjustment purposes Accordingly, the adjustable venturi 10 provides internal adjustment for length purposes in combination with angular adjustment as provided by the bending of flexible tube 32.

As indicated in the FIG. 1 and FIG. 9 embodiments, the venturi assembly of this invention with the internal adjustable securing means can be utilized with either a bottom control or a front control barbecue gas grill. As also indicated in the FIG. 9 embodiment, two of the venturi assemblies with the securing means can be employed. If desired, three or more of such venturi assemblies could be interconnected by suitable bracket members that are connected to a corresponding number of burners.

Gas-fired grill units 12 and 80 are made of cast aluminum whereas the burner elements 11 and 78 are manufactured from stainless steel. The rigid slidable tubular member 27 is made from steel and is usually chrome plated. The flexible corrugated sections 40 of the flexible tube 32 are fabricated from stainless steel. However, other heat resistant metals such as aluminum, copper or plastic materials could be employed.

As indicated previously, the venturi tube assembly 10 with the internal securing means is operable with burners of various shapes. For example, these can be of the "H" style as utilized in the FIG. 1 embodiment or of the "double U" type as illustrated in FIG. 9. The spring members 42 and 60 are easily manufactured from steel, and they can be positioned inside the slidable tubular member 27 in various manners as seen from the position of spring members 42 and 60 in FIGS. 4 and 6. In the instance where the spring is circumferentially located such as illustrated in FIG. 4, it has the advantage of being less disruptive to gas flow than that shown in FIG. 6.

While a single spring has been illustrated for use in the slidable tubular member 27, it is obvious that two or more could be employed if desired. However, this would add to the cost of the unit and would require a predetermined locating of the openings 47 and 48 with respect to the corrugations 40.

A single spring with a single projection could also be employed in conjunction with the corrugations. However, this would not afford as stable a fitment and would require an additional attachment to the tube wall such as welding. The internal securement means has been described in conjunction with a corrugated tube which is flexible. It can also be employed with such a tube which is not flexible. However, this would not afford horizontal adjustment. Further, the internal adjustment means could also be employed in conjunction with a rigid gas intake tube which slides into a flexible venturi tube. In such instance, the biasing means would be carried by the gas intake tube.

It will thus be seen that through the present invention there is now provided an adjustable venturi assembly which is fabricated to fit numerous types of barbecue grills irrespective of the vertical or horizontal space differences between the burner element and the gas supply means. Horizontal and vertical adjustment is easily effected and in a manner to provide a positive secure fitment between the two tubes. The internal adjustment securing means provides an automatic adjustment without the requirement of extra tools or parts. The internal adjustment means for the venturi tube assembly is easily manufactured as no special tooling or parts are required.

The foregoing invention can now be practiced by those skilled in the art. Such skilled persons will know that the invention is not necessarily restricted to the particular embodiments presented herein. The scope of the invention is to be defined by terms of the following claims as given meaning by the proceeding description.

I claim:

1. An adjustable gas venturi tube assembly for a gas burner element comprising:
   a first tubular member defining at least one aperture;
   an air regulator member received by said first tubular member at one end thereof to control the flow of air entering through said aperture;
   an opening defined by said first tubular member at said one end for receiving a gas supply means;
   a second tubular member connected to said first tubular member at another end of said first tubular member in a telescoping and slidable relationship;
   means for securing said second tubular member to said gas burner element at an end opposite the connection to said first tubular member; and
   internal adjustable securing means operatively associated with said first and second tubular members defined by one of said tubular members having a multiplicity of internal cavity portions and the other of said tubular members having resilient projecting means to selectively fit within said internal cavity portions to retentively maintain said tubular members in various extendable and temporarily locked positions with respect to each other, said internal adjustable securing means being hidden from external view.

2. The adjustable gas venturi tube assembly as defined in claim 1, wherein said first tubular member telescopes inside said second tubular member, said second tubular member has said internal cavity portions defined by a multiplicity of circumferential internal cavity portions and said first tubular member has said resilient projecting means.

3. The adjustable gas venturi tube assembly as defined in claim 2, wherein said circumferential internal cavity portions are defined by a corrugated flexible section.

4. The adjustable gas venturi tube assembly as defined in claim 3, wherein said resilient projecting means is defined by a spring member.

5. The adjustable gas venturi tube assembly as defined in claim 4, wherein said spring member is positioned inside said first tubular member and has opposing projection portions extended through a wall of said first tubular member.

6. The adjustable gas venturi tube assembly as defined in claim 5, wherein said spring member has a loop portion.

7. The adjustable gas venturi tube assembly as defined in claim 6, wherein said loop portion is disposed circumferentially with respect to said first tube.

8. The adjustable gas venturi tube assembly as defined in claim 6, wherein said loop portion is in substantial alignment with the longitudinal axis of said first tube.

9. The adjustable gas venturi tube assembly as defined in claim 1, wherein two said adjustable gas venturi tube assemblies are connected to a common bracket.

10. The adjustable gas venturi tube assembly as defined in claim 1, wherein said first and second tubular members are moved in a linear manner with respect to each other in order to effect adjustment.

11. A flexible and length adjustable gas/air feeder venturi tube assembly for use as a replaceable connection between a gas burner element and gas controls on diverse types of gas fired barbecue grills, said assembly comprising:
   a flexible conduit section having means for mounting on said gas burner, said flexible conduit section including internal cavities;
   a straight cylindrical substantially rigid venturi tube section telescopically and slidably engaged inside said flexible conduit section;
   resilient projecting means extending from said venturi tube section for reception in said internal cavities of said flexible conduit section to provide temporarily locked positions, the reception of said projecting member in said internal cavities being hidden from external view; and
   air inlet and air regulation means on said venturi tube section near the end thereof away from said flexible conduit section.

12. The venturi tube assembly as defined in claim 11, wherein said resilient projecting means is defined by a spring member.

13. The venturi tube assembly as defined in claim 12, wherein said spring member is positioned inside said first tubular member and has opposing projection portions extending through a wall of said first tubular member.

14. The venturi tube assembly as defined in claim 11, wherein said internal cavities are defined by a corrugated section.

15. An adjustable gas venturi tube assembly for a gas burner element comprising:
   a first tubular member defining at least one aperture;
   an air regulator member received by said first tubular member at one end thereof to control the flow of air entering through said aperture;
   an opening defined by said first tubular member at said one end for receiving a gas supply means;

a second tubular member connected to said first tubular member at another end of said first tubular member in a telescoping and slidable relationship;

means for securing said second tubular member to said gas burner element at an end opposite the connection to said first tubular member; and internal adjustable securing means operatively associated with said first and second tubular members defined by one of said tubular members having a multiplicity of internal cavity portions and the other of said tubular members having projecting means, said tubular members constructed and arranged with said projecting means to effect a resilient fitting of said projecting means within said internal cavity portions to retentively maintain said tubular members in various extendable and temporarily locked positions with respect to each other, said internal adjustable securing means being hidden from external view.

16. The venturi tube assembly as defined in claim 15 wherein said projecting means is defined by at least one dimple member.

17. The venturi tube assembly as defined in claim 15, wherein said internal cavities are defined by a corrugated section.

* * * * *